No. 878,079. PATENTED FEB. 4, 1908.
C. A. MARQUIS.
WINDING AND CUTTING MACHINE.
APPLICATION FILED MAR. 19, 1907.

Witnesses
W. C. Strin.
L. A. L. McIntyre

Inventor
Charles A. Marquis
by Hopkins & Ericks Attys.

No. 878,079. PATENTED FEB. 4, 1908.
C. A. MARQUIS.
WINDING AND CUTTING MACHINE.
APPLICATION FILED MAR. 19, 1907.

No. 878,079.  
C. A. MARQUIS.  
WINDING AND CUTTING MACHINE.  
APPLICATION FILED MAR. 19, 1907.

PATENTED FEB. 4, 1908.  
7 SHEETS—SHEET 3.

Witnesses  
W. C. Stein.  
L. A. L. McIntyre

Inventor  
Charles A. Marquis  
by Hopkins & Eicks Attys.

No. 878,079. PATENTED FEB. 4, 1908.
C. A. MARQUIS.
WINDING AND CUTTING MACHINE.
APPLICATION FILED MAR. 19, 1907.

Witnesses
W. C. Stein
L. A. L. McIntyre Inventor
Charles A. Marquis
by Hopkins & Evers Attys.

No. 878,079. PATENTED FEB. 4, 1908.
C. A. MARQUIS.
WINDING AND CUTTING MACHINE.
APPLICATION FILED MAR. 19, 1907.

Witnesses
W. C. Stein
L. A. L. McIntyre

Inventor
Charles A. Marquis
by Hopkins & Ericks Attys

No. 878,079.

PATENTED FEB. 4, 1908.

C. A. MARQUIS.
WINDING AND CUTTING MACHINE.
APPLICATION FILED MAR. 19, 1907.

Witnesses
W. C. Stein
L. A. L. McIntyre

Inventor
Charles A. Marquis
by Hopkins & Ericks Attys.

UNITED STATES PATENT OFFICE.

CHARLES A. MARQUIS, OF ST. LOUIS, MISSOURI.

WINDING AND CUTTING MACHINE.

No. 878,079.  Specification of Letters Patent.  Patented Feb. 4, 1908.

Application filed March 19, 1907. Serial No. 363,178.

*To all whom it may concern:*

Be it known that I, CHARLES A. MARQUIS, a citizen of the United States, and resident of St. Louis, Missouri, have invented certain new and useful Improvements in Winding and Cutting Machines, of which the following is a specification.

This invention relates to improvements in a winding and cutting machine for roll paper and consists in the novel arrangement, construction and combination of parts as will be fully hereinafter described and claimed.

The object of my invention is to construct a machine for rolling paper upon a spindle, and has been especially designed for rolling tar paper on a wooden spindle automatically cutting it off in a required length.

A further object of my invention is to construct a machine so arranged and regulated as to wind upon a spindle a certain number of feet of tar paper, and at a given time automatically cut the sheet and stop the operation of the machine.

A further object of my invention in connection with the winding of the tar paper upon the spindle is to sprinkle sand upon the face of the paper while the same is being rolled upon the spindle to prevent the paper from sticking together when rolled, and a registering mechanism to be automatically operated to register and indicate the number of rolls of paper that has been wound by the machine.

In the drawings: Fig. 2ᴬ is an enlarged top view of the portion of the operating mechanism broken off in Fig. 2. Fig. 14 is a detail top plan view of the mechanism used for operating the knife rollers. Fig. 15 is a cross-sectional view of the same taken on the line 15—15 of Fig. 14.

Referring to the drawings in detail 14 indicates a suitable frame consisting of the side members 15 and 16. Upon the upper horizontal rails 17 of the side members 15 and 16 I provide a frame 18 in which is supported a hopper 19. At the apex of the hopper is located a corrugated roller 20 supported in brackets 21 suitably attached to the end walls 22 of the hopper. The said corrugated roller is revolved by the sprocket wheel 23 mounted upon the shaft 24 of the roller, and is placed in operation by the sprocket chain 25 which communicates with a sprocket wheel 26 located upon the shaft 27 which is held in suitable adjustable bearings 28 located in the guide-frame 29 supported upon the rear ends of the horizontal rails 17.

Upon the shaft 27 is mounted a roller 30 and above the roller 30 and mounted in suitable journal bearings is a second roller 31. Between said rollers is passed the strip of paper to be wound, and the surplus amount of pitch or tar which adheres to the surface of the rollers 30 and 31 is removed therefrom by means of the scrapers 32 and 33 which are also held by the guide-frame 29.

Figure 1:
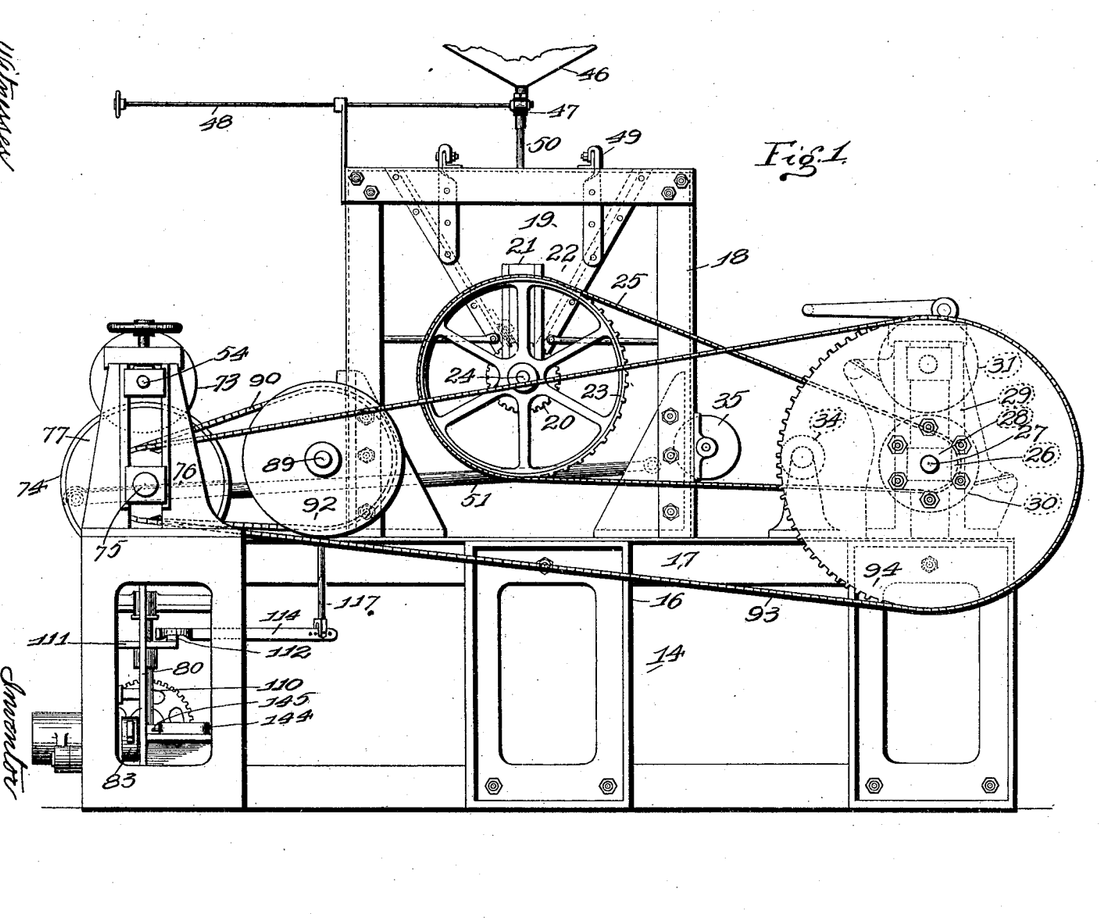
Figure 1 is a side view of my complete invention.
Figure 4:
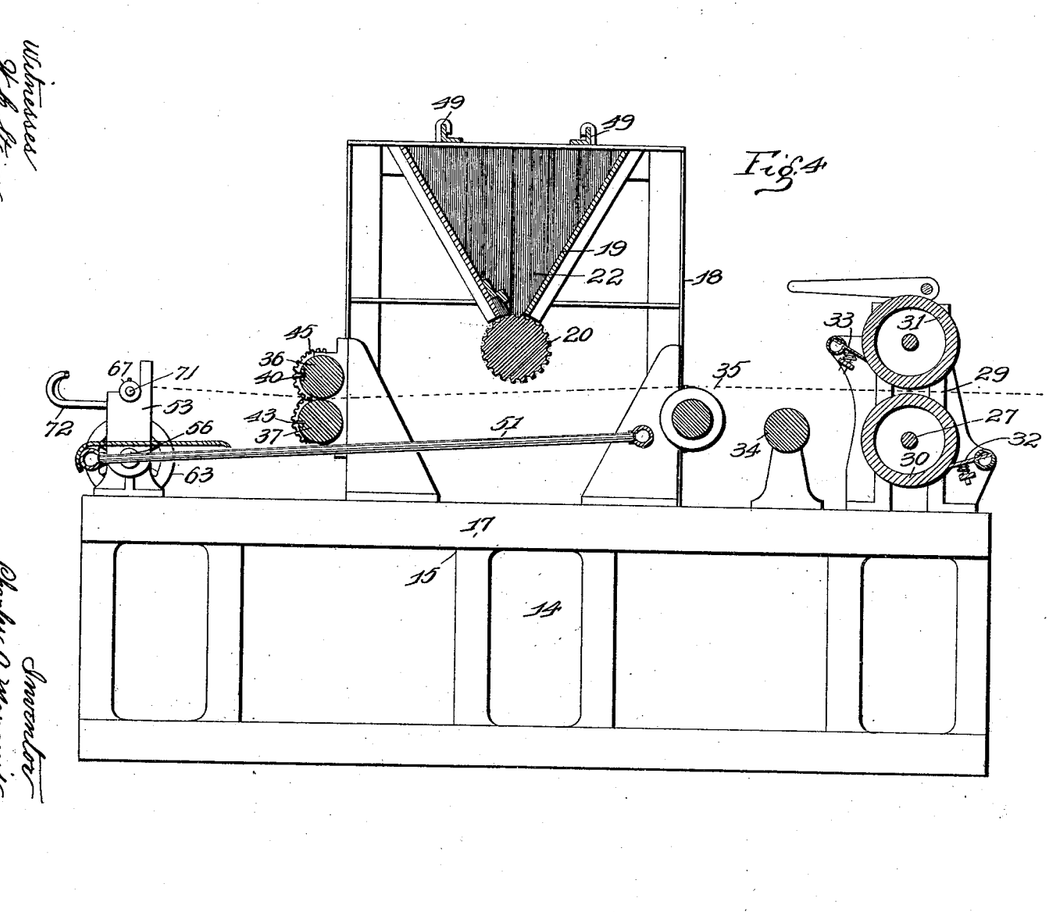
Fig. 4 is a central, vertical sectional view taken on the line 4—4 of Fig. 3.
Figure 5:
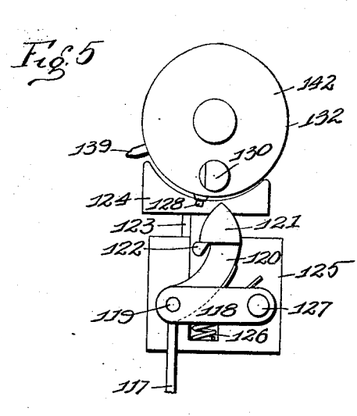
Fig. 5 is a detail, front view of the mechanism used to operate the revolving knives.
Figure 6:
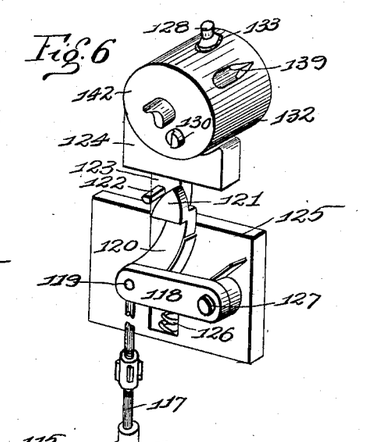
Fig. 6 is a detail, perspective view of the same showing the cam and lever mechanism by which the same is operated.
Figure 11:
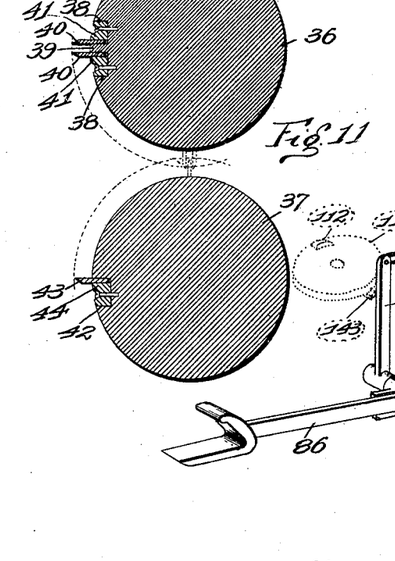
Fig. 11 is an enlarged, sectional view of the two knife rollers showing the manner in which the knives are inserted.
Figure 12:
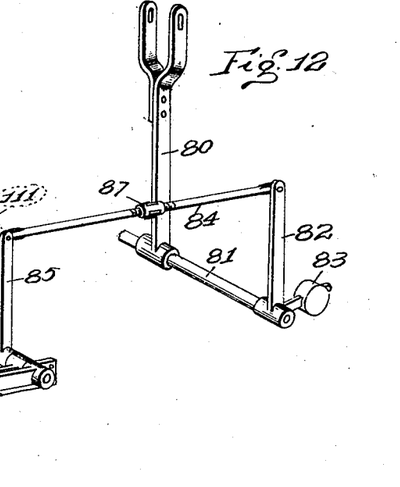
Fig. 12 is a detail, perspective view of the lever mechanism used by which the machine is placed in operation.

Upon the horizontal rails 17 immediately to the front of the guide-frame is supported an idle roller 34 upon which the strip of paper rests, supporting the surplus feed caused by the momentum of the sudden stop after the cutting of the strip. To the vertical members of the frame 18 is suitably journaled a roller 35 over which the paper passes, and the paper is then passed between the knife carrying rollers 36 and 37 which are both journaled in any suitable manner to the front members of the frame 18. In the roller 36 is provided a pair of slots 38 leaving a ridge 39 in the roller between said slots. Against said ridge are placed the knife blades 40 (see Fig. 11), and said knives are held in locked position within the grooves against the ridge by the blocks 41, and in the roller 37 I provide an elongated groove 42 in which is placed a knife blade 43 held in locked position within said groove by the block 44. The rollers are so arranged and revolved in opposite direction by means of the gear wheels 45 secured at one end of each roller, and meshing together so that the single knife 43 in the roller 37 will come between the knives 40 in the roller 36. The position of the paper passing between and over the several rollers is shown by dotted lines in Fig. 4. As the paper passes through the machine sand is sprinkled upon the upper surface by the revolving corrugated roller 20 feeding the sand thereon from the hopper 19, and the sand is conveyed into the hopper from a tank 46 shown in Fig. 1, and the flow of said sand into the hopper is regulated by means of the valve 47 operated by the operator by means of the valve stem 48.

Upon the top of the hopper 19 are placed guides 49 in which may be placed a sieve through which the sand must pass before entering the hopper, and the arrangement of the spout 50 leading from the tank 46 is such that in the event the hopper 19 should become overfilled with sand and by means of the end of the spout being close upon the sieve the backing up of the sand within the hopper will automatically shut off the flow of the sand from the spout. At the same time the sieve has a tendency to strain the sand and prevent large particles from entering into the hopper and upon the paper.

Within the frame 18 and immediately below the knife rollers 36 and 37 and extending from the rear end of the frame 18 to the front of the machine I provide a table composed of steam coils 51 through which live steam passes keeping the paper in the proper temperature while the same is being rolled upon the spindle.

Upon the front ends of the rails 17 I provide standards 52 and 53. In the upper end of the standard 52 I support one end of a shaft 54 and to said end is secured a cup 55 having a narrow, square, tapering recess, its inner surface being provided with sharp ridges to support the end of the square wooden spindle which is commonly used in rolls of tar paper.

Figure 13:
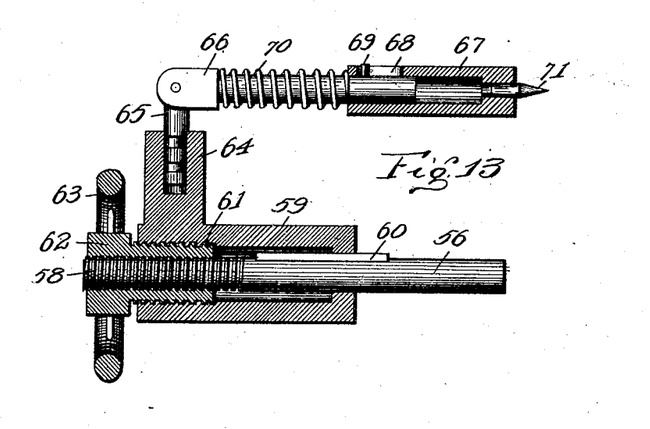
Fig. 13 is an enlarged, central, sectional view of the adjusting mechanism by which the wooden spindle is held in position to receive the roll of paper.

In the standard 53 on the opposite side of the machine I support a bar 56 by means of the set screw or bolt 57, the outer end of said bar being threaded as indicated by the numeral 58 (see Fig. 13). Over said bar is placed a sleeve 59 held in upright position by means of the key 60 supported in the bar 56, and a portion of the inner periphery of the sleeve is provided with internal screw-threads 61. Upon the threaded portion of the bar 56 I provide an internally and externally screw threaded nut 62 carrying a hand wheel 63, and by the operation of the hand wheel the sleeve 59 is adjusted inwardly or outwardly as desired.

The sleeve 59 is provided with an upwardly projecting socket 64 in which is supported a pin 65, and to the upper end of the pin 65 is hingedly secured a bifurcated bar 66. Upon the free end of the bar 66 is placed a sleeve 67 which is provided with a short slot 68 and the same is prevented from turning by means of a pin 69 supported in the bar 66 and passing through the slot 68. Upon the bar 66 between the sleeve 67 and the bifurcated end I provide a coil spring 70 which has a tendency to press the sleeve 67 outwardly to take up the adjustment of the varied lengths of spindles upon which the paper is to be rolled. In the end of the sleeve 67 I provide a point 71 which is to be brought in contact with the end of the wooden spindle.

The bifurcated bar together with the sleeve 67 is adapted to be raised vertically or swung around horizontally by means of the pin 65 and the bifurcated end, and the same is held in a horizontal position when in contact with the spindle by the upper end of the standard 53, and when out of contact and swung around by the projecting arm 72.

I will now proceed to describe the mechanism by which the spindle is revolved and by which the knives are operated to cut the paper when a certain number of feet has been wound so as to make each roll uniform in feet.

The shaft 54 which carries the cup 55 and revolves the wooden spindle upon which the paper is wound is provided with a friction wheel 73 which contacts with a grooved friction wheel 74 mounted upon the driving shaft 75. The driving shaft 75 is properly journaled within the standard 52 and frame 76, and upon said shaft is provided a pulley 77 which is operated by a belt 78 forming a line shaft. The pulley 77 is loosely mounted upon the shaft 75 and is placed in operative communication with the operating mechanism of the machine by means of the clutch 79 which is of ordinary construction.

The clutch and its mechanism are placed in operation by a bifurcated lever 80, the lower end of which is connected to a shaft 81 supported in bearings located at the bottom of the machine, and to the one end of the shaft 81 is connected an upright lever 82 and provided with a balance weight 83. To the upper end of the lever 82 is connected a connecting rod 84 and the opposite end of the connecting rod 84 is attached to the upper end of a lever 85 operated by a foot lever or treadle 86. The connecting rod 84 is provided with a turn buckle 87 whereby the connection between the levers 82 and 85 may be adjusted at will.

Upon the driving shaft 75 and located on each side of the grooved friction wheel 74 are located sprocket wheels 87ª and 88, the sprocket wheel 87ª imparting motion to the shaft 89 of the knife roller 37 by means of the sprocket chain 90 contacting with the sprocket gear 91 formed on the hub of the disk 92; the sprocket wheel 88 imparting motion to the rollers 30 and 31 by means of the sprocket chain 93 contacting with the sprocket wheel 94 mounted upon the shaft 27 which revolves the rollers 30 and 31 in opposite direction by means of the meshing gears 95 located on the opposite ends of the shafts to which said rollers are mounted.

Upon the driving shaft 75 and to one side of the sprocket wheel 88 is an additional sprocket wheel 96 which imparts motion by means of the sprocket chain 97 to a sprocket wheel 98 mounted upon a short shaft 99 supported in an adjustable bearing 100. Upon the short shaft 99 and to the opposite side of the bearing 100 is a small gear wheel 101 which meshes with a large gear wheel 102 mounted upon a shaft 103. The one end of the shaft 103 is supported in a bearing 104 and the opposite end of said shaft is supported in a bearing 105 and upon said shaft 103 is provided a worm 106 which meshes with a worm gear 107 revolving the same.

Figure 2:
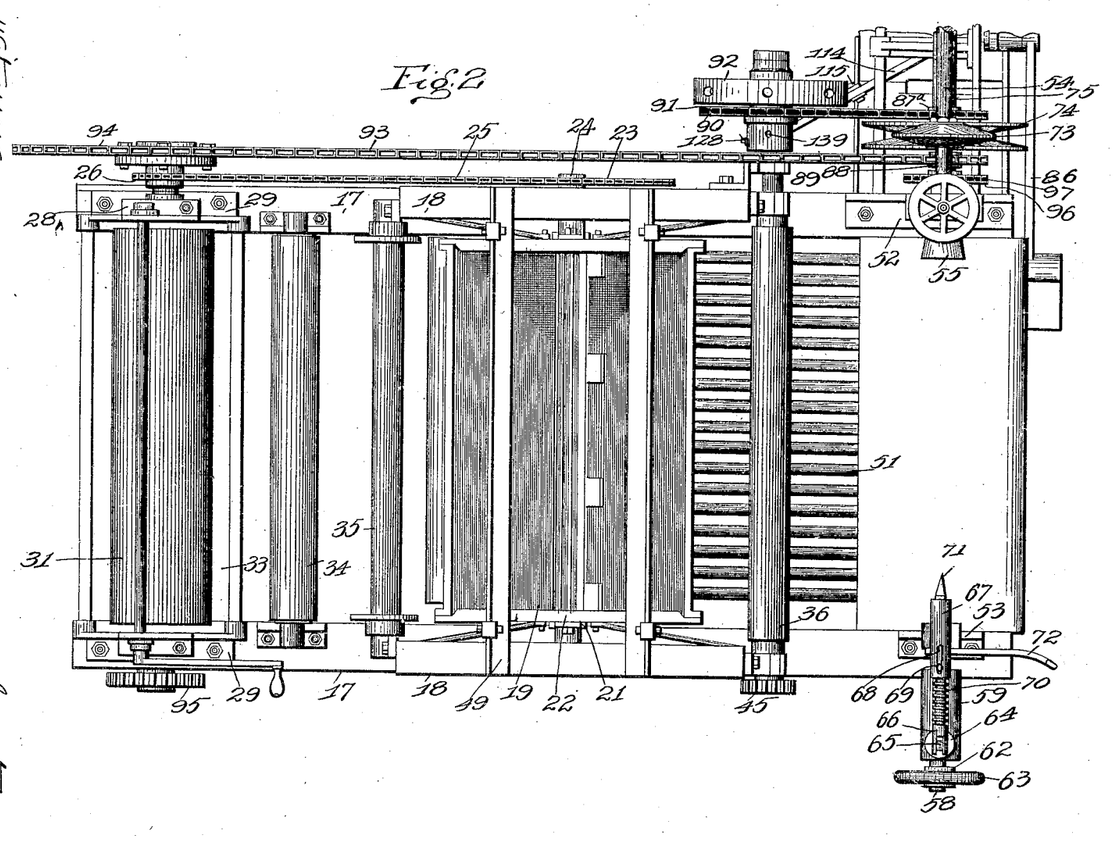
Fig. 2 is a top, plan view of the same with a portion of the operating mechanism broken away.
Figures 2A, 14, 15:
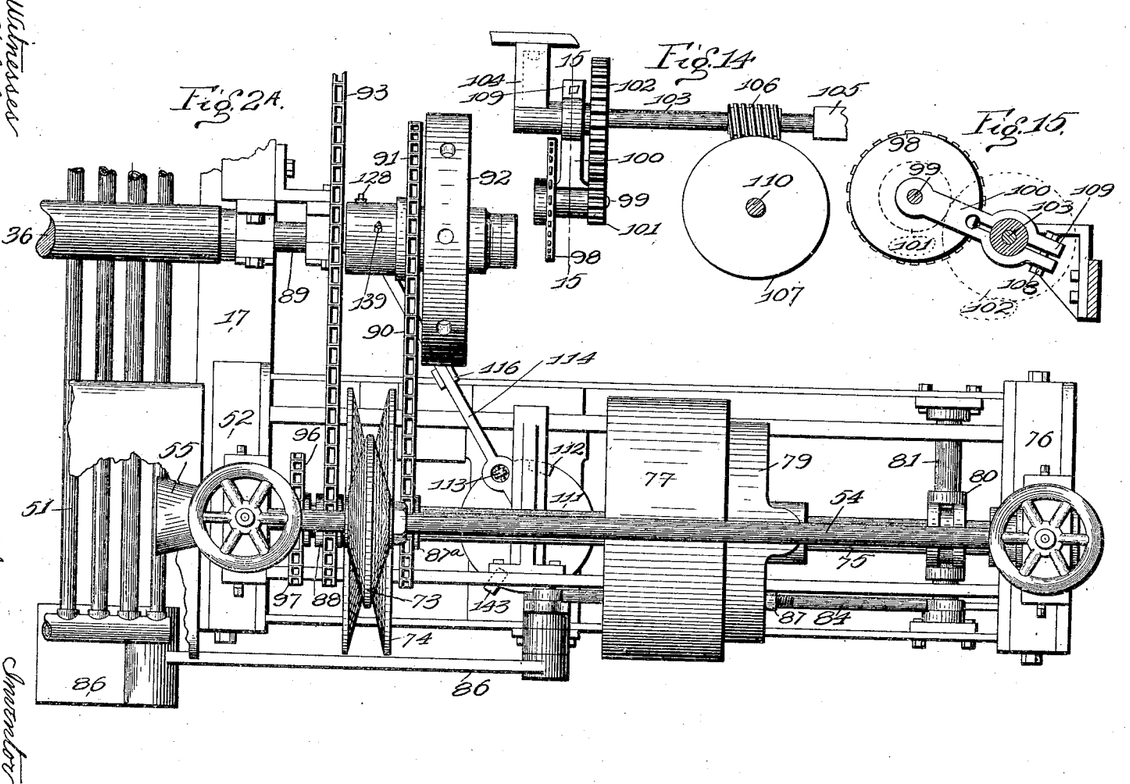
Figure 3:
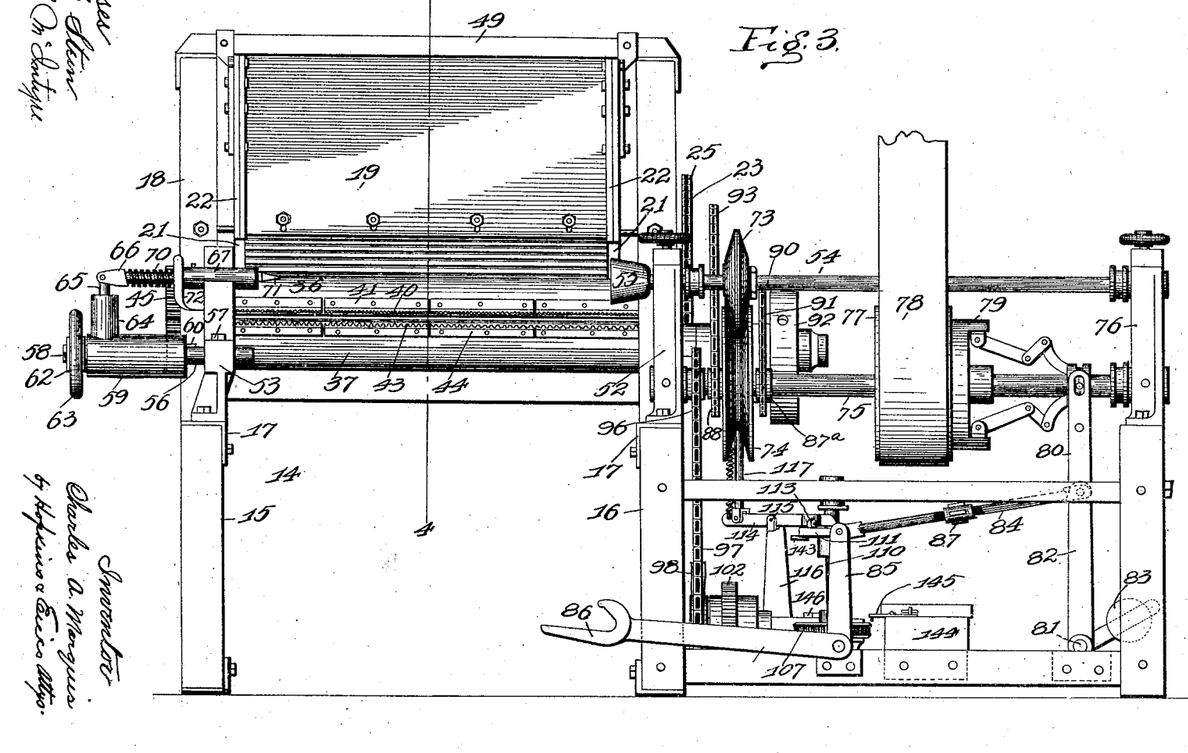
Fig. 3 is the front end of my complete invention.

The bearing 100 is adjustably held in position upon the sleeve projection of the bearing 104 for the purpose of taking up the slack of the sprocket chain 97, and this action is accomplished by means of the manipulation of the bolt 108 located on the projecting prongs 109 of the bearing 100 (see Figs. 14 and 15). By this construction of adjustment the gear wheels 101 and 102 are continuously kept in mesh while the same is being adjusted to accommodate the slack of the chain as before stated.

The worm gear 107 is located horizontally and mounted upon a vertical shaft 110, and upon said shaft is also mounted a horizontal disk 111, its upper surface being provided with a curved lug 112 which is arranged to come in contact during the revolution of the disk with a roller 113 carried by an arm 114 for tilting the same to operate the knife operating mechanism which will be hereinafter fully described.

The arm 114 is pivotally connected at the point indicated by the numeral 115 to a standard 116 the lower end of which is connected to the base in any desirable manner. To the opposite end of the arm 114 is attached a connecting rod 117, the opposite end thereof attached to the arm 118 at the point indicated by the numeral 119, and at the same point is also connected a spring-actuated lever 120, the upper end of said lever provided with a projecting tooth 121 which is arranged to come in contact with a projecting pin 122 secured to the sliding member 123 of a shoe 124.

The sliding member 123 is slidably mounted in a dove-tailed groove formed in the plate 125, and in said groove is located a spring 126 which contacts with the lower end of the sliding member 123 which has a tendency to keep the sliding member and shoe in raised position after the tooth 121 has disengaged the pin 122.

Figures 7, 8, 9, 10:
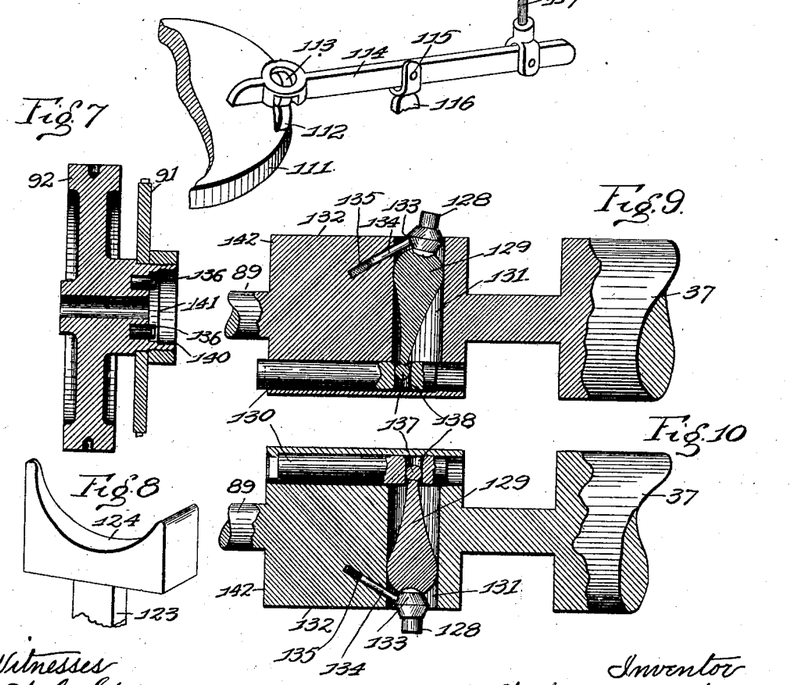
Fig. 7 is a central, vertical, sectional view of the disk carried by one of the knife rollers which communicates with and stops the revolution of the knives.
Fig. 8 is a detail, perspective view of the shoe made use of in connection with the knife operating mechansim.
Figs. 9 and 10 are sectional views of one of the knife rollers showing the manner in which the stop pins are placed in and out of operation.

The arm 118 is pivotally connected at the point indicated by the numeral 127 to the plate 125. The shoe 124 is constructed tapering in form as shown in Fig. 8, the purpose of which is to permit the head 128 of the trigger member 129 to come in contact and push the trigger member 129 inwardly to operate the pin 130 in the position as shown in Fig. 10.

The trigger member 129 is located in a bore 131 formed in the hub section 132 of the shaft forming part of the knife roller 37. The head of the trigger member is provided with an inclined surface 133 with which comes in contact a spring controlled pin 134 which is located in an angular bore 135 formed in the hub section, and the tendency of said pin 134 is to keep the trigger member in the position as shown in Fig. 9 when the head 128 is out of contact, thereby causing the end of the pin 130 to project outwardly so that the same may come in contact when revolved with the projecting lugs 136 formed in the hub of the disk 92. Motion is imparted to the pin 130 by the ball-end 137 of the trigger member resting within a bore 138 formed in the pin 130.

The disk 92 together with the sprocket wheel 91 is loosely mounted upon the end of the shaft of the knife roller 37 and only imparts motion to the knife rollers when the pin 130 is placed in position to contact with the lugs 136. In the hub section 132 is also provided a projecting pin 139 which is so arranged as to come in contact with the tooth 121 and release the same from the pin 122. The object of this is while the shaft is in operation the pin 139 is to remove the tooth from the pin, and thereby permit the shoe 124 to rapidly rise so that the head 128 will contact with its inclined surface and draw the pin 130 inwardly so as to release its end from contact with the lugs 136.

In the hub of the disk 92 I provide a recess 140 which forms a flange 141 with which contacts the edge 142 of the hub section 132, and thereby prevents any portion from contacting with the lugs 136 until the pin 130 is permitted to project outwardly. The operation of this knife operating mechanism is as follows: After the machine has been placed in operation and while the material is being wound upon the spindle the worm 106 and worm gear 107 are placed in operation revolving the disk 111 and this mechanism is so geared as to make a complete revolution when a certain number of feet of material is wound upon the roller. At this junction the lug 112 comes in contact with the lever 114 raising the one end thereof and causing its opposite end to draw downwardly upon the spring-controlled arm 120 through the agency of the connecting rod 117 thereby lowering the shoe 124. At this point the head 128 of the trigger member is released from the inclined surface of the shoe and permitted to assume its position as shown in Fig. 9 forcing the end of the pin 130 outwardly. Immediately upon this action by the continuous revolution of the disk 92 one of the lugs 136 will come in contact with the pin 130 and revolve the knife rollers cutting off the material. At this point the pin 139 comes in contact with the tooth 121 thereby releasing it from the pin 122 which will then permit the shoe 124 to rapidly rise upwardly by means of the spring 126 in advance of the contacting of the head 128 with the tapered surface of the shoe 124. The object of this action is to permit the knife rollers to make but one revolution and by the first lowering of the shoe 124 release the head 128 of the trigger member permitting the pin 130 to extend outwardly and engage with the lugs 136, and while the hub section is revolved and before the roller 113 of the lever 114 is released from the projection the pin 139 releases the shoe and permits the same to come in alinement with the head 128 drawing the pin 130 backwards so as to release the contact points and permit the disk 92 and sprocket wheel 91 to continue in idle revolution. At this same instant contact is made between the lever 85 and the lug 143 formed on the disk 111, thereby forcing the lever mechanism rearwardly and releasing the clutch 79, discontinuing the operation of the machine, yet permitting the pulley 77 to idly revolve on the shaft 75. The spindle together with its rolled contents is then removed from its position between the points of contact, and a new spindle placed in position. The paper is then sufficiently pulled forward by the operation and folded over the wooden spindle and by means of the foot treadle 86 the clutch is again thrown in contact and the machine placed in operation for winding another roll.

On the base of the machine I provide an indicating mechanism 144 which may be of any desirable construction, and from the indicator projects an arm 145 which is arranged to come in contact with a lug 146 formed on the top surface of the worm gear 107 and indicates upon the indicator the number of rolls wound by the machine.

In connection with the operation of the lug 143 coming in contact with the arm 85 throwing the lever mechanism rearwardly this motion is assisted by means of the counterbalance weight 83.

Having fully described my invention, what I claim is:

1. A winding and cutting machine comprising a suitable frame through which the material is passed, a spindle revolving mechanism, a set of knives revolubly mounted and located on each side of the sheet of material, means for operating the revoluble knives to sever the material at a given length, means for discontinuing the operation of the knives after the material is to be cut, and means for automatically discontinuing the operation of the machine at the time when the material is cut, substantially as specified.

2. A winding and cutting machine comprising a frame, a plurality of guide and feed rollers mounted in the frame over which and through which the sheet of material is passed to be wound upon a spindle, a spindle operating mechanism, knives located in the frame to sever the material when a required amount is wound upon the spindle, a knife operating mechanism, a mechanism for automatically placing the knives in and out of operation, a driving mechanism, a lever mechanism for placing the driving mechanism in and out of operation, means for automatically discontinuing the operation of the machine when the knives have been operated and the material severed, and an adjusting mechanism for accommodating various lengths of spindles upon which the material is to be wound, substantially as specified.

3. A winding and cutting machine comprising a frame, feed rollers mounted upon said frame, guide rollers mounted upon said frame, a set of knife carrying rollers mounted upon said frame, between the feed rollers and knife carrying rollers and over the guide rollers the sheet of material is to be passed, a hopper mounted upon the frame and above the sheet of material, an adjustable spindle retaining mechanism carried by the frame to accommodate various lengths of spindles, a spindle retaining and operating mechanism carried by the frame, a mechanism for controlling the knife carrying rollers so as to bring said knives in contact with the material and sever the same when a required amount of material is wound upon the spindle, a lever mechanism for operating the knife roller mechanism, a disk mounted in the frame to contact with the lever mechanism for placing in operation the knife operating mechanism, a lever mechanism for placing the machine in and out of operation, means carried by the disk to contact with the lever mechanism to automatically discontinue the operation of the machine at the time the knives have severed the sheet of material, substantially as specified.

4. A device of the class described comprising a spindle retaining and operating mechanism, a driving mechanism, a lever mechanism arranged to place the driving mechanism in operation by the operator, a set of knife rollers, a trigger mechanism carried upon the shaft of one of the knife rollers, a shoe located in alinement with the trigger mechanism for placing the rollers in and out of operation, means for operating the shoe to permit the trigger mechanism to operate and revolve the knives, a disk revolubly mounted in the frame to operate the lever mechanism whereby the shoe is raised and lowered, and means whereby a lever mechanism is operated to discontinue the operation of the driving mechanism at the point when the material is severed by the knives, substantially as specified.

5. A device of the class described comprising a spindle operating mechanism, a set of knives, means for operating the knives to sever the sheet of material at a time when a given amount of material is wound upon the spindle, and means for discontinuing the operation of the knives and spindle after the material has been cut, and means for calculating the number of rolls wound by the machine, substantially as specified.

6. A device of the class described, comprising a frame, a spindle operating mechanism supported by the frame, an adjusting mechanism for retaining a spindle of various lengths to be revolved by the spindle operating mechanism, a pair of revolving knife rollers supported by the frame, knives carried by the knife rollers, means for operating the knives to sever the sheet of material at a time when a given amount of material is wound upon the spindle, and a mechanism for automatically discontinuing the operation of the knives and spindle operating mechanism after the material has been cut, substantially as specified.

7. A winding and cutting machine comprising a frame, a plurality of rollers supported by the frame over which the sheet of material to be cut is located, a pair of knife rollers located in the front of the machine and supported by the frame, a knife carried by one of said rollers and a pair of knives carried by the other roller, an operating mechanism for revolving the knife rollers to bring the knives in contact to sever the sheet of material at a given time, a spindle operating mechanism, an adjusting device for supporting one end of the spindle and to accommodate the varying lengths, a mechanism for discontinuing the operation of the knife rollers, a spindle operating mechanism, a mechanism for placing the machine in operation to continue the winding and cutting of the material when placed upon another spindle, and a means for calculating the number of rolls wound and cut by the machine, substantially as specified.

In testimony whereof, I have signed my name to this specification, in presence of two subscribing witnesses.

CHARLES A. MARQUIS.

Witnesses:
 ALFRED A. EICKS,
 WALTER C. STEIN.